UNITED STATES PATENT OFFICE.

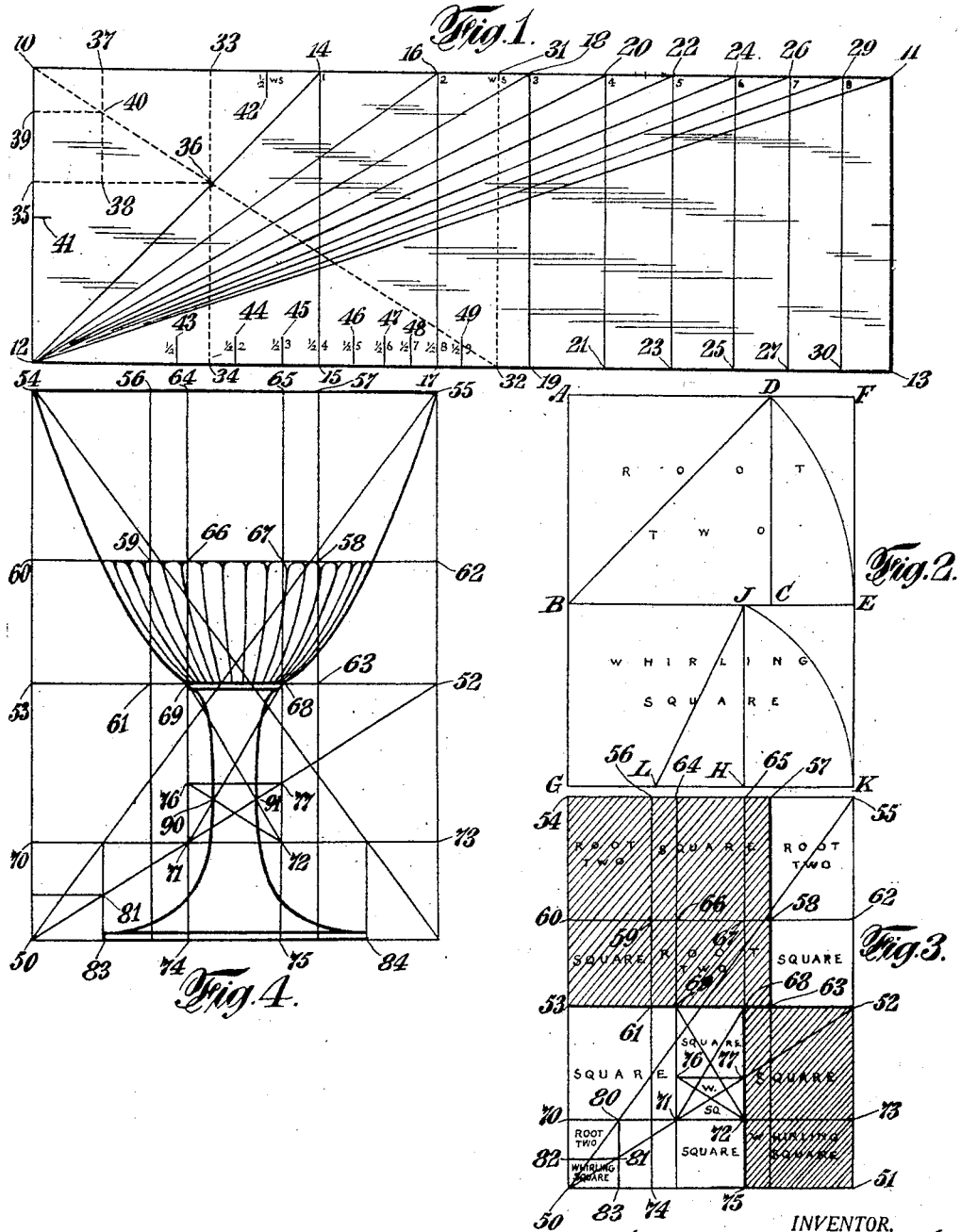

ALBERT A. SOUTHWICK, OF NEW YORK, N. Y.

DESIGNER'S TOOL.

1,376,475.   Specification of Letters Patent.   Patented May 3, 1921.

Application filed August 15, 1919. Serial No. 317,664.

*To all whom it may concern:*

Be it known that I, ALBERT A. SOUTH-WICK, a citizen of the United States, and a resident of the city, county, and State of New York, have invented certain new and useful Improvements in Designers' Tools, of which the following is a specification.

My invention relates to improvements in designer's tools and more particularly to tools adapted to aid designers in selecting critical points on a design to obtain most pleasing and correct proportions and positions. The tool may be used in the designing of buildings, furniture ornaments and structures of all kinds. Further and more specific objects, features and advantages will more clearly appear from the detail description given below taken in connection with the accompanying sheet of drawings which forms a part of this specification.

In the drawings Figure 1 is a plan view of a tool embodying my improvements in the preferred form thereof, Fig. 2 is a diagram illustrating the method of forming a root rectangle and a whirling square, one superposed above the other. Fig. 3 is a diagram of such root rectangle and whirling square, illustrating one method of dividing the same into smaller root rectangles and whirling squares, and Fig. 4 is a diagram illustrating the use of the diagram of Fig. 3 in designing a goblet.

Referring to Fig. 2, I there show a square of suitable dimensions bounded by the points A, B, C and D. To form therefrom what is known as a root two rectangle I make a rectangle, A, B, E, F, whose height equals the height of the square A, B, C, D, and whose base equals the diagonal B D. In other words a root two rectangle consists of a square with an area added to one side thereof to form a rectangle whose base is equal to the diagonal of the square. Referring to Fig. 1 the tool there shown consists of a transparent sheet such as celluloid or other suitable material having sufficient transparency. The sheet is rectangular in form and bounded by the points 10, 11, 12 and 13. A line 14—15 is marked thereon to form a square 10, 12, 15, 14 at one end of the sheet, the sides of the square being equal in length to the height of the sheet 10—12. From this square is made a root two rectangle 10, 16, 17, 12 in the manner above described and bounded by the edges of the sheet and the line 16—17 marked thereon.
Another rectangle 10, 18, 19, 12 of the same height is then formed the base of which is equal to the diagonal 12—16 of the root two rectangle and this second rectangle is known as a root three rectangle. Another rectangle, 10, 20, 21, 12, of the same height is then formed the base of which is equal to the diagonal 12—18 of the root three rectangle and this third rectangle is known as a root four rectangle. Another rectangle 10, 22, 23, 12 of the same height is then formed the base of which is equal to the diagonal 12—20 of the root four rectangle and this fourth rectangle is known as a root five rectangle. In a similar manner further root rectangles are demarked on the sheet, a root six rectangle by the line 24—25, a root seven rectangle by the line 26—27, a root eight rectangle by the line 29—30 and a root nine rectangle by the line 11—13. The process may be carried further but the above is generally sufficient for practical purposes and defines what I mean by root rectangles.

Referring again to Fig. 2, I there show a square, B, G, H, J, and from this square there is formed a rectangle B, G, K, E, whose height is the same as that of the square B, G, H, J, and whose base G—K is determined by extending the base of the square, B, G, H, J, a distance, from the center L of its base line, equal to the distance from the center L of the base line to one of the upper corners J of the square. This rectangle B, G, K, E, is known as a whirling square rectangle or merely as a whirling square, and consists of a square B, G, H, J, and an excess rectangle J, H, K, E, which has the same proportions as the larger whirling square rectangle B, C, K, E. When a square is marked off from one end of this excess rectangle J, H, K, E, it again will leave an excess rectangle which has the same proportions as the whole rectangle B, G, K, E, and so on indefinitely. The above explains what is meant by whirling square.

Referring again to Fig. 1, I there show marked on the tool a whirling square, 10, 31, 32, 12 based on the original square, 10, 14, 15, 12, the excess rectangle being defined by the points 14, 31, 32, 15. Taking this whirling square 10, 31, 32, 12 I may divide off from the other end thereof by line 33—34 a square 33, 31, 32, 34, of the same size as the original square 10, 14, 15, 12, leaving an excess whirling square rectangle 10, 33, 34, 12 having the same proportions as the original whirling square rectangle 10, 31, 32, 12, but smaller. I then mark off from one end of this excess rectangle 10, 33, 34, 12, a square 35, 36, 34, 12 leaving a still smaller excess whirling square rectangle 10, 33, 36, 35 also of the same proportions as the original whirling square 10, 31, 32, 12. By then marking off a square 37, 33, 36, 38, from this last excess rectangle 10, 33, 36, 35, I produce another still smaller excess whirling square 10, 37, 38, 35, and by marking off on one end of this a square 39, 40, 38, 35, I produce a still smaller whirling square 10, 37, 40, 39. The process may be carried further but the above is generally sufficient for practical purposes.

I also preferably mark on the tool a line 41 indicating the center of the line 10—12 and a line 42 indicating the center line of the whirling square, 10, 31, 32, 12. At 43 I mark a line indicating the center of the base of the original square 10, 14, 15, 12. At 44 I mark a line indicating the center of the base of the root two rectangle 10, 16, 17, 12. At 45 I mark a line indicating the center of the base of the root three rectangle. The center of the base of the root four rectangle is indicated by the point 15, i. e., the root four rectangle is just double the original square from which it was formed. At 46 I mark a line indicating the center of the base of the root five rectangle. At 47 I mark a line indicating the center of the base of the root six rectangle. At 48 I mark a line indicating the center of the base of the root seven rectangle. The center of the base of the root eight rectangle is at the point 17, i. e., the root eight rectangle is just double the root two rectangle. At 49, I mark a line indicating the center of the base of the root nine rectangle. It will be noted that all the whirling squares have the same diagonal line so far as direction is concerned, so that a whirling square of any size may be made by drawing lines along the edges 10—11 and 10—12 and drawing a diagonal thereto in the direction of the diagonal 10—40—36—32 and then completing the rectangle with the desired length of base or height. At 36, I preferably perforate the tool so that a pencil point may be passed therethrough to mark the point on the sheet of paper beneath the tool, on which sheet of paper the design is being made. The tool may also be perforated at other points of lineal intersection if desired.

Referring to Figs. 3 and 4 I there illustrate the use of my tool in the design of a goblet. Having decided that the bowl of the goblet should have greater depth than the rest and desiring to use both the proportions of a single root two rectangle and a whirling square I draw on paper, with the aid of the tool shown in Fig. 1, a whirling square 50, 51, 52, 53, and above this I superpose a root two rectangle 52, 53, 54, 55, having a base 52—53 of the same length as the base 50—51, so that the rectangle 52, 53, 54, 55 which is to form boundary points for the bowl, is of greater depth than the whirling square rectangle 50, 51, 52, 53, which is to form boundary points for the base of the goblet. Having decided that the upper part of the bowl should be plain for the greater part of its depth I divide the root two rectangle 52, 53, 54, 55, into a series of squares 54, 60, 66, 64 and 55, 65, 67, 62 and 56, 59, 58, 57, in the upper portion and 60, 53, 61, 59 and 58, 62, 52, 63 in the lower portion, and such that root two rectangles are formed by the points 54, 56, 59, 60, and 57, 58, 62, 55, and 59, 61, 63, 58, forming and drawing these diagonals 12—16 of the root two rectangle and the diagonal 12—14 of the square, on the tool in Fig. 1 are used to determine the boundaries. Then by similar use of the whirling squares and their diagonal on the tool I divide the whirling square 50, 51, 52, 53, into a series of squares and corresponding whirling squares, the larger squares being bounded by the points 53, 69, 71, 70, and 68, 52, 73, 72 and the smaller squares being bounded by the points 71, 72, 75, 74 and 76, 77, 68, 69, while the larger whirling squares are bounded by the points 68, 52, 51, 75 and 53, 69, 74, 50, and the smaller whirling squares formed therefrom are bounded by the points 72, 73, 51, 75 and 70, 71, 74, 50 and 76, 77, 72, 71. By drawing the diagonal 50—55 I am enabled with the aid of the tool to mark off from one end of the whirling square 70, 71, 74, 50 a small root two rectangle 70, 80, 81, 82 and a small whirling square 81, 82, 50, 83 directly underneath the diagonal 50—55 where it crosses the line 70—73 being used to determine the length of base of the root two rectangle and the diagonal 50—52 where it crosses the line 80—83 being used to determine the height of the whirling square 81, 82, 50, 83. In Fig. 3 certain sections are cross-hatched merely to more clearly indicate the division.

Referring to Fig. 4 I there show the same arrangement of squares, root rectangles and whirling squares as shown in Fig. 3 (but on a somewhat larger scale) and with the goblet design made thereon. Using the line 54—55 for the top of the goblet and the 53—52 as the base line for the bowl with the points 68 and 69 as defining the base of the bowl, the plain part of the bowl is accurately and pleasingly determined by the line 60—62. The points 83 and 84 accurately define the width of the base of the goblet while the points 90 and 91 consistently define the width of the stem. The above is given merely as an illustration of the use of the tool in determining a few important points in a design. In many cases much more of the design may be similarly determined and the various areas used to properly proportion the size of parts. It is apparent that for best success the tool must be used intelligently and results depend to a considerable extent on the ability of the designer, the tool being intended to aid in determining accurately proper critical points according to geometrical system after the designer has planned a general scheme for the design.

While I have described my improvements in great detail and with respect to a preferred embodiment thereof, I do not desire to be limited to such details and embodiment, since many changes and modifications may be made and the invention embodied in widely differing forms without departing from the spirit and scope thereof in its broader aspects.

What I claim as new and desire to secure by Letters Patent, is:

1. A designer's tool comprising a transparent sheet, the edge of which serves as guiding means for the drawing of one or more sides of a whirling square and a series of root rectangles and which sheet has indicia at the edges of the sheet demarking practically exactly the diagonal of the whirling square and the diagonals of the root rectangles, of which the edges of the sheet form sides.

2. A designer's tool comprising a sheet, the edge of which serves as a guiding means for the drawing of one or more sides of a series of root rectangles and which sheet has indicia thereon demarking practically exactly the diagonals of the root rectangles of which the edge of the sheet forms a side.

3. A designer's tool comprising a sheet the edge of which serves as a guiding means for the drawing of one or more sides of a whirling square and which sheet has indicia thereon demarking practically exactly the diagonal of said whirling square of which the edge of the sheet forms a side.

4. A designer's tool comprising a sheet in the form of a root rectangle and having lines thereon demarking a series of root rectangles all of the same width as said sheet and said sheet having a line thereon indicating the diagonal of a whirling square, three of the sides of which are coincident with the sides of the sheet.

In testimony whereof, I have signed my name to this specification.

ALBERT A. SOUTHWICK.

It is hereby certified that in Letters Patent No. 1,376,475, granted May 3, 1921, upon the application of Albert A. Southwick, of New York, N. Y., for an improvement in "Designers' Tools," an error appears in the printed specification requiring correction as follows: Page 1, line 96, for the letters "B, C, K, E." read B, G, K, E.; and that the said Letters Patent should be read with this correction therein that the same may conform to the record of the case in the Patent Office.

Signed and sealed this 12th day of July, A. D., 1921.

[SEAL.]                                                      KARL FENNING,

*Acting Commissioner of Patents.*

Cl. 33—1.